United States Patent [19]
Himmelberger

[11] Patent Number: 5,509,699
[45] Date of Patent: Apr. 23, 1996

[54] MECHANICAL JOINT PIPE ADAPTER WITH INSERTED FLEXIBLE SPLINE

[75] Inventor: John Himmelberger, Chester Springs, Pa.

[73] Assignee: CertainTeed Corporation, Valley Forge, Pa.

[21] Appl. No.: 254,348

[22] Filed: Jun. 6, 1994

[51] Int. Cl.⁶ .......................... F16L 23/02; F16L 23/024
[52] U.S. Cl. .................. 285/337; 285/321; 285/374; 285/415
[58] Field of Search ................... 285/321, 415, 285/337, 305, 374

[56] References Cited

U.S. PATENT DOCUMENTS

| | | | |
|---|---|---|---|
| 1,556,745 | 10/1925 | Banta | 285/415 |
| 2,774,617 | 12/1956 | Lanninger | 285/415 |
| 3,334,929 | 8/1967 | Wiltse | 285/305 |
| 3,759,553 | 9/1973 | Carter | 285/305 |
| 3,861,722 | 1/1975 | Kenyon | 285/337 |
| 3,865,410 | 2/1975 | Chen | 285/337 |
| 3,986,234 | 6/1976 | Sundholm | 285/305 |
| 4,092,036 | 5/1978 | Sato et al. | 285/337 |
| 4,269,436 | 5/1981 | Medney | 285/305 |
| 4,610,471 | 9/1986 | Halen et al. | 285/337 |
| 4,627,774 | 12/1986 | Bradley | 411/5 |
| 4,779,900 | 10/1988 | Shumard | 285/114 |
| 4,878,698 | 11/1989 | Gilchrist | 285/342 |
| 4,896,903 | 1/1990 | Shumard | 285/337 |
| 5,071,175 | 12/1991 | Kennedy, Jr. | 285/337 |
| 5,255,945 | 10/1993 | Toon | 285/305 |
| 5,398,980 | 3/1995 | Hunter et al. | 285/337 |

FOREIGN PATENT DOCUMENTS

| | | | |
|---|---|---|---|
| 671103 | 9/1963 | Canada | 285/321 |
| 944406 | 3/1974 | Canada | 285/305 |
| 688307 | 3/1965 | Italy | 285/415 |
| 78524 | 5/1951 | Norway | 285/415 |
| 2136522 | 9/1984 | United Kingdom | 285/305 |

Primary Examiner—Eric K. Nicholson
Attorney, Agent, or Firm—Duane, Morris & Heckscher

[57] ABSTRACT

Mechanical pipe adapters are provided by this invention which include a gland for fitting around the circumference of a first pipe. The gland includes an annular recess located along its inner diameter and an aperture through a side wall of the gland for communicating with the annular recess. The adapter further includes a flexible spline inserted into the annular recess through the side aperture. The flexible spline forms a mechanical lock between the first pipe and the gland. After mounting the gland to a pipe, such as a PVC pipe, the gland can be thereafter mounted to a flanged end of a pipe, e.g., a cast iron fitting.

3 Claims, 4 Drawing Sheets

5,509,699

MECHANICAL JOINT PIPE ADAPTER WITH INSERTED FLEXIBLE SPLINE

FIELD OF THE INVENTION

This invention relates to devices for coupling axially aligned piping together, and more particularly, to adapters for coupling fluid transport piping made of different materials.

BACKGROUND OF THE INVENTION

Pipe junction restrainers and techniques for their assembly have been developed to make fluid-tight connections between two axially-aligned pipe joints, valves, fittings, hydrants or other types of fluid connections. Often these junction restrainers must withstand extraordinarily great pressures associated with water distribution and sewer connections. Segmented or split pipe joint retainer glands are well known and typically are secured together around a pipe section by ears or lugs formed on, or extending radially outwardly from, the gland segments. In addition, because of the forces involved, heavy concrete thrust blocks are often used to minimize movement.

In recent years, it has been the practice of many contractors to employ polyvinyl chloride (PVC) plastic pipe in new construction. Unfortunately, many of the underground sewer and water distribution pipes, fittings and valves still contain cast iron and ductile iron. Since these dissimilar materials cannot be joined by conventional means, such as brazing, soldering or gluing, gland restraining devices have been adapted to provide a fluid-tight connection.

Some current gland restrainer systems designed for PVC piping employ mechanical restrainer connections intermittently disposed around the PVC pipe in a gripping fashion. The gland segments of these devices are then bolted together to complete the connection.

Not all of these restrainer connections, however, can resist the type of sudden thrusts associated with fluid abruptly applied in the axial direction. Some of these arrangements are known to bend and separate at the joints between the segments and often permit the pipes to separate. It is also difficult to mechanically attach to PVC pipe, since the softer polymer tends to deform if radial or compressive stresses are concentrated on its surface. Moreover, PVC is notorious for its slippery surface, thereby frustrating restraining devices which principally rely upon friction and elastomeric gaskets alone.

One popular system currently employed exclusively for plastic pipe connections sold under the trademark CERTA-LOK™ VIP and produced by CertainTeed Corporation, Valley Forge, Pennsylvania, provides a restrained joint between. PVC pipe for municipal, fire protection, and other uses. The joint connector uses a series of o-ring seals and internal annular cavities that are filled externally with polymeric dowels after two sections of PVC pipe are inserted into the connector. These dowels also fill matching annular cavities located on the pipe sections to form a restraining mechanical lock that has rated at 150 psi and up. Since the restraining mechanism of the CERTA-LOK™ joint connector is uniformly distributed around the PVC pipes, the risk of damaging the plastic side walls by localized stress fracture is minimized. Unfortunately, until now, there has been no similar technique for holding pipe joints of dissimilar materials together.

Accordingly, there remains a need for a mechanical joint gland adapter for permitting the assembly of fluid-type fittings containing multiple materials, such as PVC and cast iron. There also remains a need for providing an inexpensive gland adapter which can be field-assembled quickly without much assembly time.

SUMMARY OF THE INVENTION

Mechanical joint pipe gland adapters and methods for assembling pipes and fittings, etc. made of dissimilar materials, and especially PVC pipes to metal fittings, are provided by this invention. The pipe adapter includes a gland for fitting around the circumference of a first pipe. The gland includes an annular recess located along its inner diameter and an aperture through its side wall which communicates with the annular recess. The adapter further includes a flexible spline inserted into the annular recess of the gland through the side aperture. The flexible spline forms a mechanical lock between the first pipe and the gland adapter and provides a uniform restraining force.

Accordingly, this invention provides mechanical joint gland adapters and procedures which are simple to use and much less expensive than devices which require radial fixation actuators and the like. Since the flexible spline of this invention can be manufactured from a tough polymeric material, it is virtually impossible to sever the gland from its underlying restraining pipe without altogether destroying the pipe itself. The joint retainer glands of this invention can be reversibly disengaged simply by removing the flexible spline for quick access to the interior of the piping system, for example, during cleaning or emergency repair.

The gland adapters of this invention are designed and engineered to provide positive resistance to thrust forces, and to eliminate the need for concrete thrust blocks, tie rods, harnesses, or other methods of restraining pipe in properly engineered water systems. These adapters provide a fast method for restraining PVC pipe to standard mechanical joint fittings made of cast iron or ductile iron. They accommodate a full working pressure of at least about 150 psi and can reduce labor, materials, and overall installation time and costs by providing a less labor intensive installation. The adapters of this invention can also resolve space limitation problems that may be encountered, where thrust blocks could be difficult or prohibited, such as underground structures, conflicting utility services or future excavation and utilities. They can be installed in virtually all soil types, where the occurrence of low bearing strength or unstable soil conditions could prohibit the use of concrete thrust blocks.

In a further embodiment of this invention, mechanical pipe connections are provided for assembling a polymeric pipe to a metal fitting having a mechanical joint end. These connections include an adapter sized to fit around the polymeric pipe which includes an annular recess located along its inner diameter and an aperture through the side wall for receiving a flexible dowel-like spline. The polymeric pipe of this connection also includes at least one annular recess which can be matched with the recess of the adapter to produce an annular cavity below the adapter when it is mounted on the polymeric pipe. This cavity is then filled with the flexible spline to produce a mechanical lock between the polymeric pipe and the adapter. One or more threaded fasteners can be disposed between the adapter and the mechanical joint end of the metal fitting to finish the connection. To make this seal fluid tight, a resilient joint gasket can be provided in the joint prior to tightening the fasteners.

BRIEF DESCRIPTION OF THE DRAWINGS

The accompanying drawings illustrate preferred embodiments of this invention according to the practical application of the principals thereof, and in which.

DETAILED DESCRIPTION OF THE INVENTION

This invention provides mechanical joints between dissimilar piping materials, including pipes, valves, various pipe fittings, hydrants, and miscellaneous connections in piping systems, including sewer systems, water distribution systems, and chemical transport systems. As used herein, the term "pipe" includes all of the above connections and those that are consistent with the principals of this invention.

Figure 1:
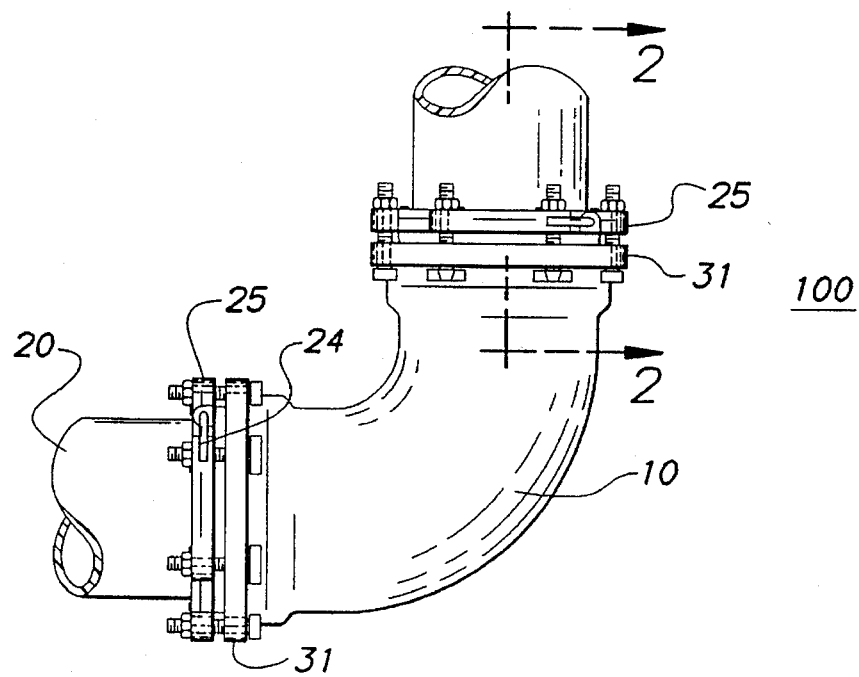
FIG. 1 is a side elevation view of a cast iron fitting mounted by a pair of mechanical joint pipe adapters of this invention to a pair of PVC pipes.
Figure 2:
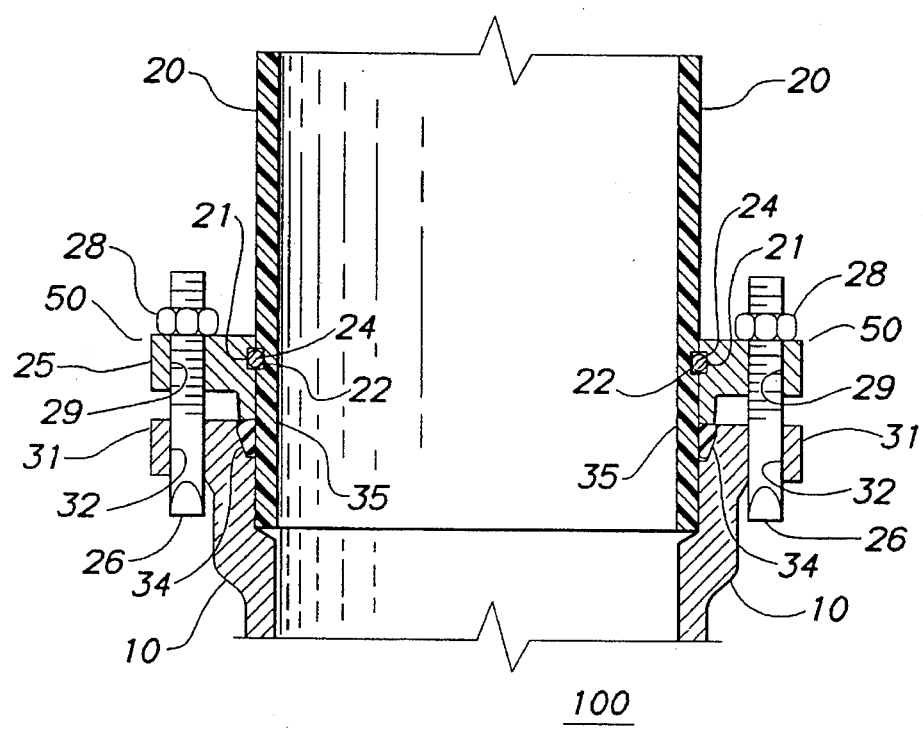
FIG. 2 is a side elevation, cross-sectional view taken through line 2—2 of FIG. 1, illustrating the mechanical locking spline and gasket features of this invention.
Figure 3:
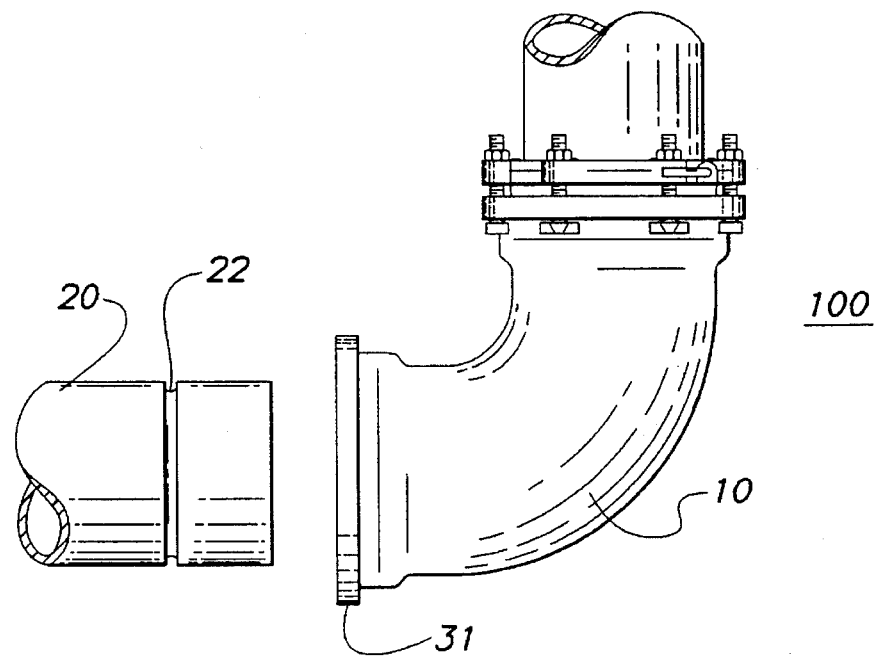
FIG. 3 is a side elevation view of a PVC pipe being prepared for joining to a cast iron fitting.

With reference to FIGS. 1 and 2, the preferred mechanical pipe connection 100 will now be described. In this connection, a metal fitting 10, typically made of ductile iron or cast iron is provided. The metal fitting 10 includes a mechanical joint end 31 equipped with fastener holes 32. Such pipes are ubiquitous throughout the United States, especially in the older, more established, cities.

Since one of the primary purposes of this invention is to provide a connection between a standard metal fitting 10 and a pipe of a different type of material, such as plastic (e.g., PVC) pipe 20, the connection between these materials should be strong enough to withstand high axial loads caused by rushing fluid through the piping system, for example, loads greater than about 150 psi.

This invention provides, in a preferred embodiment, an adapter gland 25 having an internal diameter that closely matches the external diameter of the plastic pipe 20. The adapter gland 25 can be made of a stiff polymer, such as acetal, nylon, phenolic, polycarbonate, poly(amide-imide), polyester (TP), PEEK, polyimide, polyphenylene sulfide, sulfones, mixture of these, and their fiber-filled counterparts. More preferably, the gland 25 includes a metal which is compatible with the metal fitting 10, such as cast iron or ductile iron.

The adapter gland 25 further includes an annular recess 21 located along its inner diameter. This annular recess 21 is preferably matched or at least partially overlapping with a mating annular recess 22 along the outer diameter of the plastic pipe 20. When these annular recesses 21 and 22 are aligned, an annular cavity is formed between the adapter gland 25 and the plastic pipe 20. This cavity preferably is sized to snugly receive the flexible spline 24 and can be circular, square or rectangular in cross-section. Since the relationship between the spline 24 and the formed cavity is as close as possible to a "forced fit", it is desirable that a side aperture 33 be provided through the side wall of the adapter gland 25 to insert the flexible spline 24 after the adapter gland 25 has been inserted over the plastic pipe 20.

Figure 7:
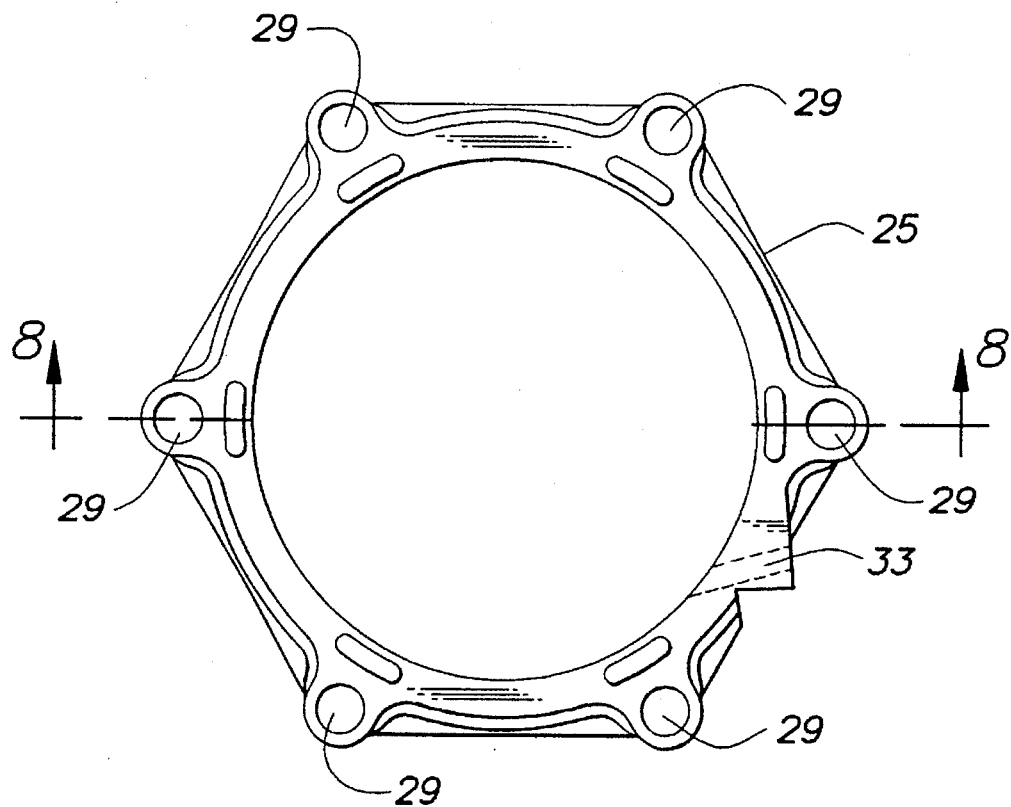
FIG. 7 is a top elevation view of a preferred gland portion of the pipe adapter of this invention.
Figure 8:
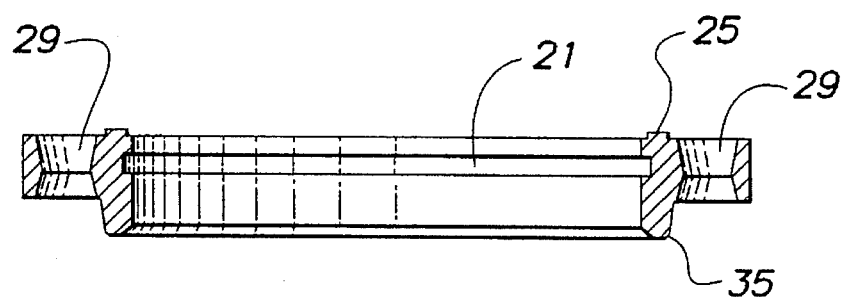
FIG. 8 is a side elevation, cross-sectional view, taken through line 8—8 of FIG. 7, illustrating the fastener holes and annular recess of the preferred gland.

With respect to FIGS. 7 and 8, the preferred adapter gland 25 will now be described in more detail. The side aperture 33 is provided through the side wall of the adapter flange almost tangentially to the annular recess 21 as shown in FIG. 7. This permits the flexible spline 24 to be threaded into the annular recess by hand at a construction site. The flexible spline 24 is preferably made of a synthetic resinous material, such as polyethylene, polypropylene, polystyrene, PVC, nylon, polyamide, and the like. Although these materials are flexible, they are designed to resist compression under the typical working pressures of most fluid piping systems. Additionally, since the flexible spline 24 is preferably not elastomeric, the resulting mechanical lock will not become unjoined unless and until the spline is removed back through the aperture 33 in the side wall. To facilitate removal, a small length of the spline 24 can be left outside of the gland 25 so that it can be grasped and removed.

Optionally, a molten or flowable polymer can be injected into the annular cavity through aperture 33 and then solidified to form a permanent mechanical lock.

Relating back to the cross-sectional depiction of FIG. 2, the mechanical pipe connection 100 can also include a resilient joint gasket 34 mounted between the metal fitting 10 and the plastic pipe 20. In a preferred embodiment, the adapter gland 25 has an axially extending lip 35 which compresses against the resilient joint gasket 34 upon final assembly.

The final connection can be provided by a plurality of threaded fasteners 26 mounted between the adapter gland 25 and the mechanical joint end 31 in a series of fastener holes 29 and 32. These fastener holes 29 and 32 are preferably aligned to accept the threaded fasteners 26 prior to securing them with nuts 28. In a preferred embodiment, a series of Tee bolts are employed for facilitated mechanical joining. Four to twelve fastener holes can be provided along the peripheral edge of the adapter gland 25 and mechanical joint end 31 to make these connections. Preferred dimensions for the various elements of the mechanical pipe connection 100 are disclosed below in Table I.

TABLE I

DIMENSIONS OF PREFERRED EMBODIMENTS

| NOMINAL PLASTIC PIPE SIZE | ADAPTOR O.D. (INCHES) | WORKING PRESSURE | NO. OF TEE BOLTS REQUIRED | TEE BOLT SIZE | APP. WEIGHT LBS. | SPLINE WIDTH (INCHES) | SPLINE LENGTH (INCHES) |
|---|---|---|---|---|---|---|---|
| 4" | 4.80 | 150 psi | 4 | ¾" × 3½" | 6 | ¼ round | 18 |
| 6" | 6.90 | 150 psi | 6 | ¾" × 3½' | 9 | ¼ round | 24 |
| 8" | 9.05 | 150 psi | 6 | ¾" × 4" | 13 | 5/16 square | 32 |
| 10" | 11.10 | 150 psi | 8 | ¾" × 4" | 15 | ⅜ square | 39 |
| 12" | 13.20 | 150 psi | 8 | ¾" × 4" | 21 | ⅜ square | 46 |

Figure 4:
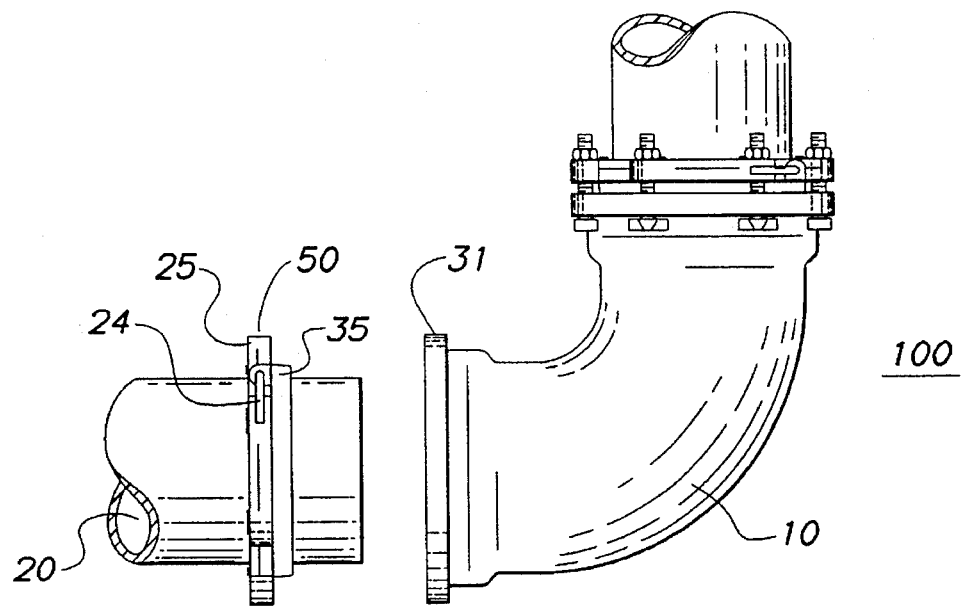
FIG. 4 is a side elevation view of a preferred pipe adapter of this invention being inserted over the PVC pipe of FIG. 3, and the preferred spline being inserted into the adapter.
Figure 5:
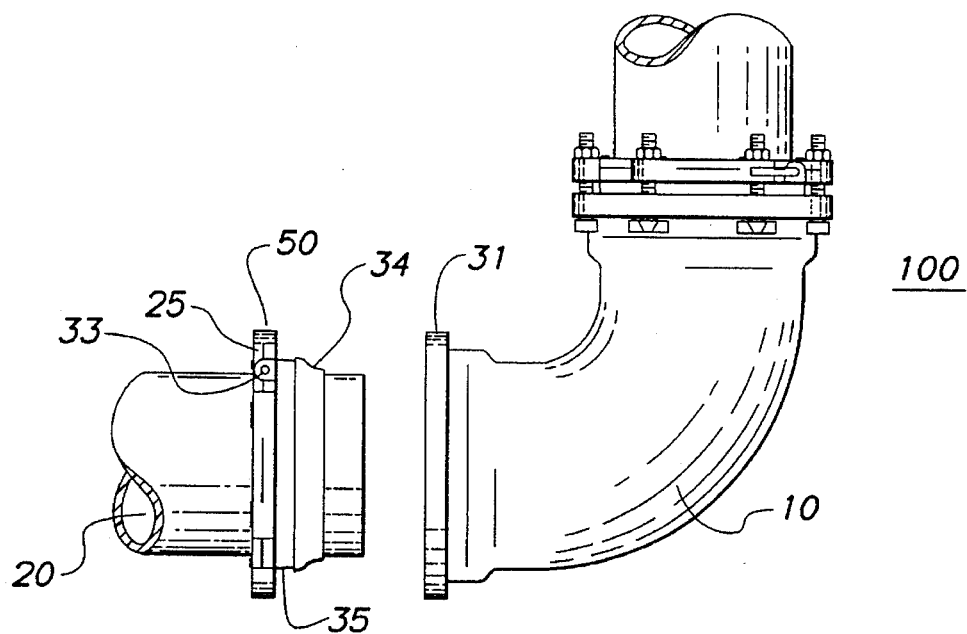
FIG. 5 is a side elevation view of the PVC pipe of FIG. 4 with its adapter and resilient gasket in place as it is inserted into the female coupling of the cast iron fitting.

This invention also provides a procedure for mechanically joining pipes and fittings, etc., made of dissimilar materials. As shown in FIGS. 3–6, the steps of this procedure will now be explained. In the first step shown in FIG. 3, the PVC pipe 20 is measured for identifying the proper location of the adapter gland 25. This measurement is used to align the annular recesses 21 and 22 located along the adapter gland 25 and the plastic pipe 20. Next, as shown in FIG. 4, the adapter gland 25 is inserted over the PVC pipe 20 with the extending lip 35 facing toward the end of the plastic pipe 20. The flexible spline 24 is then inserted through the side wall aperture 33 until it is fully seated around nearly the entire circumference of the plastic pipe 20. A spline insertion tool can be used to assist in faster installation, particularly with larger pipe sizes. When the spline 24 is inserted, it will mechanically lock the adapter gland 25 onto the plastic pipe 20. A resilient joint gasket 34, preferably made of a synthetic rubber or the like, is then lubricated and inserted over the leading edge of the PVC pipe and against the extending lip 35 of the adapter gland 25 as shown in FIG. 5. The gasket 34 ideally includes a tapered leading edge for easy insertion into the fitting socket of the metal fitting 10. With firm and uniform pressure, one can insert the leading edge of the now gland adapter-equipped PVC pipe into the female receptacle of the metal fitting 10. The joint should be kept straight during this process.

Figure 6:
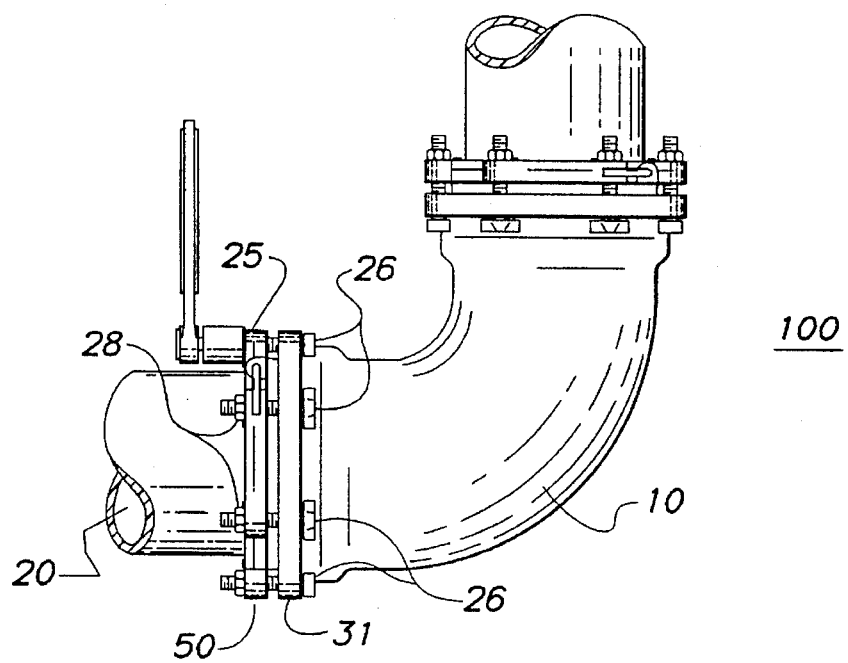
FIG. 6 is a side elevation view of the mechanical joint connection of FIG. 5, during the insertion and tightening of the fasteners.

As shown in FIG. 6, the Tee bolts are then inserted and the nuts tightened to a bolt torque of about 75–90 lbf-ft to bring the adapter gland 25 and the mechanical joint end 31 into a close relationship. The adapter gland 25 and mechanical joint end 31 need not be touching, and preferably provide a uniform gap of one quarter-one inch so that the axially extending portion 35 of the adapter flange 25 can provide a compressive force to the trailing edge of the resilient joint gasket 34, as shown in FIG. 2.

From the foregoing, it can be realized that this invention provides improved pipe connections and procedures for mechanically joining pipes and fittings of dissimilar materials. The use of a flexible polymeric spline that substantially encompasses a polymeric pipe in a carved recess uniformly distributes any axial loads created by the contents of the pipe so that stress fractures can be substantially eliminated. Additionally, the compressive strength of the spline can be engineered to create any degree of restraint up to the modulus of the polymeric pipe. Although various embodiments have been illustrated, this is for the purpose of describing, and not limiting the invention. Various modifications, which will become apparent to one skilled in the art, are within the scope of this invention described in the attached claims.

What is claimed, is:

1. A high pressure, mechanical pipe-to-fitting connection comprising:

a polymeric pipe having a first annular recess along its outer diameter;

a metal fitting having a flanged end including a plurality of fastener holes therein;

and an adapter sized to fit around said polymeric pipe, said adapter including a second annular recess located along its inner diameter and an aperture through its side wall which communicates with said second annular recess, said first and second annular recesses forming an annular cavity when said adapter is mounted and aligned on said polymeric pipe, said adapter further including a flexible spline inserted into said annular cavity for forming a mechanical lock between said polymeric pipe and said adapter; said polymeric pipe and said metal fitting being joined together by fasteners disposed through the fastener holes of said adapter and said flanged end of said metal fitting, said connection rated for a working pressure of no less than about 150 psi.

2. The pipe connection of claim 1, wherein said metal fitting and said polymeric pipe are sealed together with a resilient joint gasket.

3. The pipe connection of claim 2, wherein said adapter comprises an axially extending lip which impinges against said resilient joint gasket when said fasteners are applied.

\* \* \* \* \*